United States Patent [19]
Sweeney

[11] Patent Number: 5,116,133
[45] Date of Patent: May 26, 1992

[54] APPARATUS FOR AND METHOD OF IDENTIFYING SPECTRALLY PURE OPTICAL RADIATION

[75] Inventor: Harold E. Sweeney, Menlo Park, Calif.

[73] Assignee: GTE Government Systems Corporation, Stamford, Conn.

[21] Appl. No.: 483,702

[22] Filed: Feb. 23, 1990

[51] Int. Cl.⁵ ............................................. G01B 9/02
[52] U.S. Cl. ..................................... 356/352; 356/346
[58] Field of Search ................................ 356/346, 352

[56] References Cited

U.S. PATENT DOCUMENTS

| | | | |
|---|---|---|---|
| 3,824,018 | 7/1974 | Crane, Jr. ............................. | 356/352 |
| 4,170,416 | 10/1979 | Fencil ................................. | 356/346 |
| 4,594,002 | 6/1986 | McNally ............................. | 356/346 |
| 4,595,292 | 6/1986 | Amodeo et al. .................... | 356/346 |
| 4,600,307 | 7/1986 | Krohn et al. ....................... | 356/346 |
| 4,743,114 | 5/1988 | Crane, Jr. ........................... | 356/346 |

*Primary Examiner*—Samuel A. Turner
*Attorney, Agent, or Firm*—John F. Lawlor; James J. Cannon, Jr.

[57] ABSTRACT

Spectrally pure optical radiation (SPOR) such as laser radiation is effectively distinguished from broadband optical radiation such as sunlight and herein called radiation of unknown spectral purity (RUSP) by apparatus including an etalon, which apparatus determines balance or unbalance between the respective portions of a signal incident on the etalon that are reflected by and transmitted through the etalon. Unbalance between the two signal portions indicates the presence of SPOR. The intensities of the reflected and transmitted radiation are compared and a determination of inequality or unbalance indicates SPOR whereas equality or balance indicates spectrally impure radiation. Measurement of the sum of the intensities of the reflected and transmitted radiation also provides an estimate of the angle of incidence of RUSP on the etalon.

The invention also comprehends the method of identifying SPOR consisting of the steps of directing RUSP toward an etalon, comparing the intensities of the transmitted and reflected radiation, and indicating that RUSP is SPOR if the intensities are unequal or unbalanced. The method also includes measuring the sum of intensities of the reflected and transmitted radiation to provide an estimate of the angle of incidence of RUSP.

9 Claims, 3 Drawing Sheets

APPARATUS FOR AND METHOD OF IDENTIFYING SPECTRALLY PURE OPTICAL RADIATION

BACKGROUND OF THE INVENTION

This invention relates to improved apparatus for and a method of identifying spectrally pure optical radiation (SPOR) in radiation of unknown spectral purity (RUSP).

The use of radar systems to detect and locate various targets such as aircraft and surface ships is well known. It is desirable and useful in certain situations for personnel in such targets to know when they are illuminated by radar signals and to alarm warning receivers when this occurs. One technique for attempting to achieve this objective in the past has been to use a narrow filter to measure received energy within the bandwidth. A wide spectral signal would have a small fraction of its energy within the filter band compared to a spectrally pure signal. The problem with this technique is that it requires often unavailable prior knowledge of the signal wavelength.

Another prior technique employs an etalon whose spacing is modulated. A spectrally pure signal is indicated by the fringe modulation of the signal intensity detected after the etalon. However, in this technique the spectral function of a pulse signal may not be determined if the unknown pulse rate is not favorable compared to the modulation rate of the etalon.

This invention is directed to apparatus for and a method of determining the presence of SPOR without the foregoing problems and limitations.

OBJECTS AND SUMMARY OF THE INVENTION

A general object of the invention is the provision of apparatus for and a method of identifying SPOR in RUSP without foreknowledge of wavelength or pulse rate of received signals.

Another object is a provision of such apparatus and method in which identification of SPOR is relatively independent of the angle of arrival of the RUSP, i.e., such identification is achieved at a plurality of different angles of arrival of RUSP.

A further object is the provision of apparatus for and a method of estimating the angle of arrival of RUSP.

These and other objects are achieved with an etalon and two detectors, one detector monitoring transmission of RUSP through the etalon, the other monitoring RUSP reflected from the etalon, and means to compare the outputs of the two detectors. If such outputs are substantially the same, the input radiation is not spectrally pure; if they are not equal or balanced, the input radiation is spectrally pure. Through use of a plurality of such detectors, the angle of arrival of the received radiation is determined.

DESCRIPTION OF PREFERRED EMBODIMENT

Figure 1:
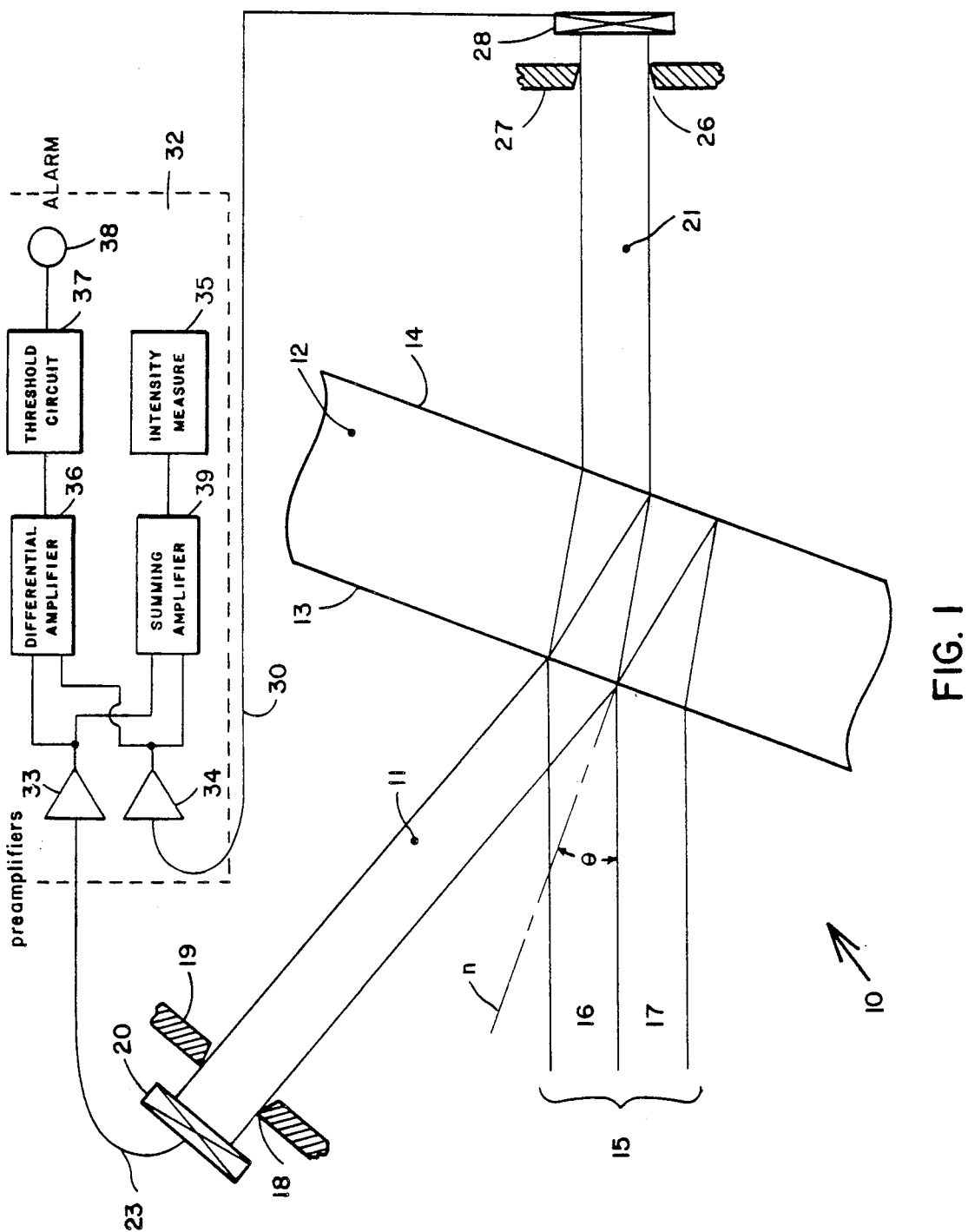
FIG. 1 is a simplified schematic diagram of apparatus useful in the practice of the invention and showing an input radiation beam at one input angle.

Referring now to the drawings, apparatus 10 embodying the invention comprises an etalon 12 having laterally spaced plane parallel partially reflecting and partially transmitting, surfaces 13 and 14, and an input radiation beam 15 of unknown radiation purity incident on etalon 12 at an angle $\theta$ relative to the normal n to surface 13. A portion 16 of beam 15 is reflected from etalon surface 13 and a portion 17 thereof is reflected from surface 14, both portions 16 and 17, now superimposed in composite beam 11, hereinafter called a reflected beam, passing through an aperture or slit 18 in an opaque screen 19 and being incident on optical detector 20. By way of example, detector 20 may be a pyroelectric photodetector which converts reflected beam 11 into an output electrical signal on line 23 having a magnitude proportional to the intensity of that reflected beam.

In a similar manner portion 16 of beam 15 passes directly through etalon 12 and through slit 26 in opaque screen 27. Portion 17 of beam 15 is internally reflected in sequence from etalon surfaces 14 and 13 and exits etalon 12 and also passes through slit 26 in opaque screen 27. Detector 28, placed behind slit 26, intercepts simultaneously some of portion 16 and portion 17 of beam 15 which are combined in composite beam 21, hereinafter called a transmitted beam.

In accordance with the principle of this invention, both of the two parallel surfaces 13 and 14 are partially transmitting and partially reflecting. This comprises a parallel plate Fabry Perot interferometer, i.e. an etalon. Incident radiation at an angle $\theta$ and of wavelength $\lambda$ will constructively interfere for the transmitted beam when the following relation is satisfied:

$$\cos\theta = \frac{m\lambda}{2nd} \quad (1)$$

where
d is the spacing between the surfaces,
n is the refractive index of the material, and
m is an integer.

When constructive interference occurs in the transmitted beam, destructive interference occurs in the reflected beam. Conversely, when $$\cos\theta = \frac{(m + \frac{1}{2})\lambda}{2nd} \quad (2)$$

destructive interference occurs in the transmitted beam and constructive interference occurs in the reflected beam. At a single wavelength, conservation of energy will dictate that the two beams are complementary. A spectrally pure signal will normally have unbalanced beam intensities.

A signal which is not spectrally pure contains a multitude of wavelengths, some of which will satisfy the first condition of constructive interference in the transmitted beam and some of which will destructively interfere in the transmitted beam.

The effect of these multiple wavelengths all present and acting simultaneously on the detector pair is to produce signals which can be balanced and will be invarient with incident angle.

The relative intensities of reflected beam 11 and transmitted beam 21 are determined to be either the same or different by comparing the magnitudes of electrical signals on lines 23 and 30 by means of circuit 32. Circuit 32 comprises preamplifiers 33 and 34 connected to output lines 23 and 30, respectively, a differential amplifier 36, a threshold circuit 37, such as a bridge, and an alarm device 38 such as a light emitter or bell. Differential amplifier 36 and threshold circuit 37 monitor the equality or inequality of magnitude of signals on lines 23 and 30 and energize device 38 when those signals are unequal or unbalanced. The latter condition signifies that a spectrally pure input radiation beam 15 such as a laser radar beam has been received.

Circuit 32 also includes a summing amplifier 39 connected to the outputs of preamplifiers 33 and 34 and an intensity measuring device 35 connected to the output of amplifier 39. By directing the signals from the preamplifiers 33 and 34 to a summing amplifier 39 and device 35, an estimate of the intensity of the incident radiation is made. This is effective for either spectrally pure signal or a signal which is not spectrally pure.

Figure 2:
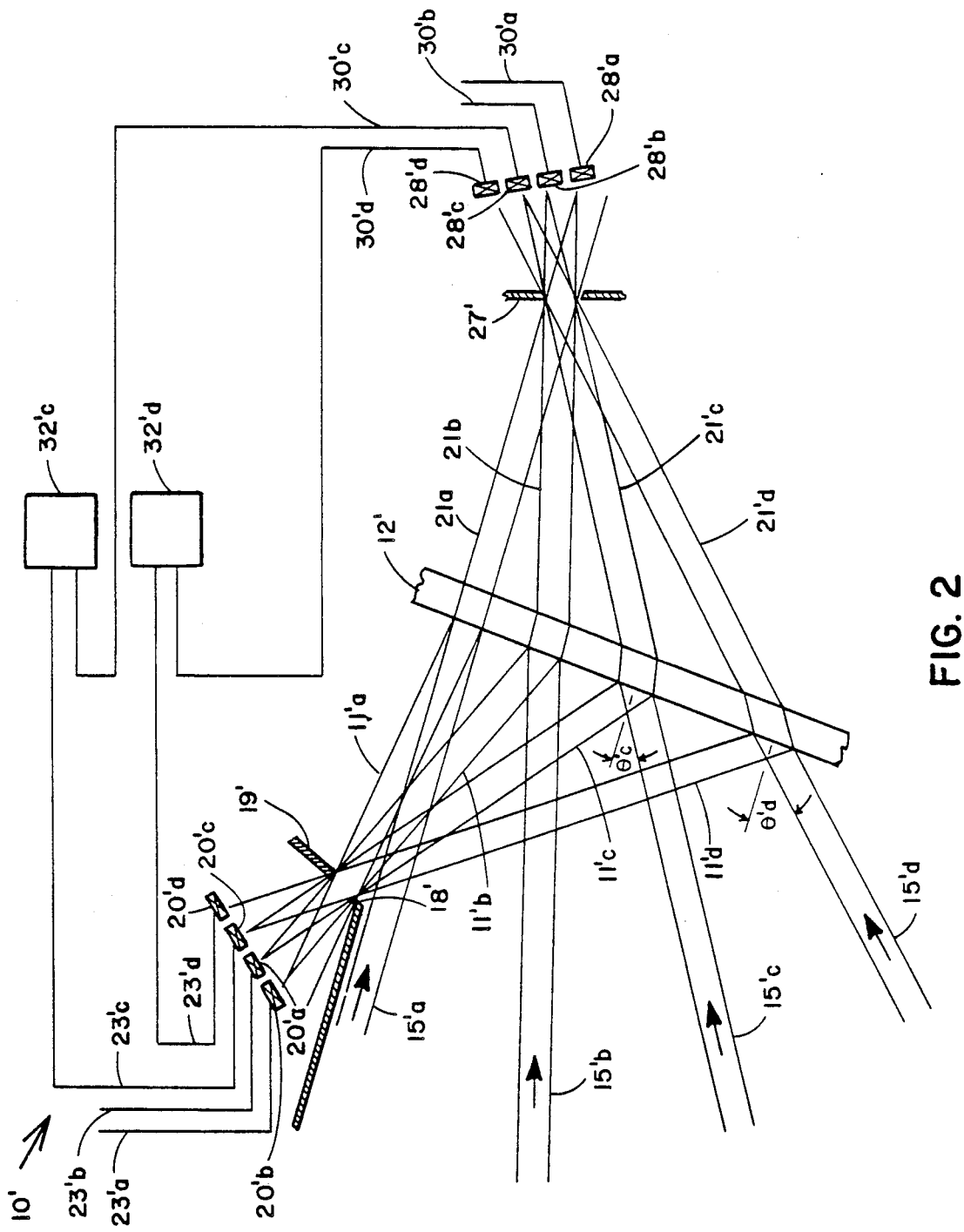
FIG. 2 is a diagram similar to part of FIG. 1 showing the input radiation beam incident on the etalon from several different angles in the same plane.

In addition to identifying SPOR, the invention may also be practiced to identify simultaneously the angle of arrival of the radiation of interest. In order to achieve this result, there is provided apparatus 10' shown in FIG. 2 and which is similar to apparatus 10 of FIG. 1, like parts being indicated by the primes of like reference characters on the drawing. As shown in FIG. 2, incoming RUSP beam 15' is incident on etalon 12' at four different angles, the beam at each different angle being designated by the subscripts a-d. A plurality of four separate detectors 20'a-20'd, inclusive, as shown, are arranged adjacent to each other in a row behind slotted screen 18' and positioned to receive beams 11'a-11'd, respectively, reflected from etalon 12'. Similarly, a like plurality of detectors 28'a-28'd, inclusive, are disposed behind screen 27' and positioned to receive transmitted beams 21'a-21'd, respectively. The pair of detector outputs 23'd and 30'd are fed to comparator circuit 32'd and similarly the outputs of each other pair of corresponding detector outputs are fed to a separate comparator circuit.

In operation, a RUSP beam incident on etalon 12' at angle $\theta'd$ along the direction of propagation of beam 15'd divides into reflected beam 11'd, (16' and 17' not being shown) and transmitted beam 21'd which are received by detectors 20'd and 28'd, respectively. The outputs 23'd and 30'd of detectors 20'd and 28'd, respectively, are fed to comparator circuit 32'd which simultaneously indicates by its alarm device that SPOR has been received at angle $\theta'd$. Similarly each of the other comparator circuits, only one more of which, circuit 32'c, is shown, functions to indicate the presence of SPOR and the particular angle $\theta'$ of RUSP incidence corresponding to that comparator circuit. If the incident angle is intermediate adjacent angles $\theta'a$, $\theta'b$; $\theta'b$, $\theta'c$; $\theta'c$, $\theta'd$; adjacent detectors are active. The angle of arrival may be interpolated by the relative signal levels on the adjacent detectors.

Note in FIG. 2 that four detector pairs are used. As the angle of arrival changes by 15°, the signal transfers completely from one pair to the adjacent pair. Therefore, the acceptable field of regard will exceed 45°.

Figure 3:
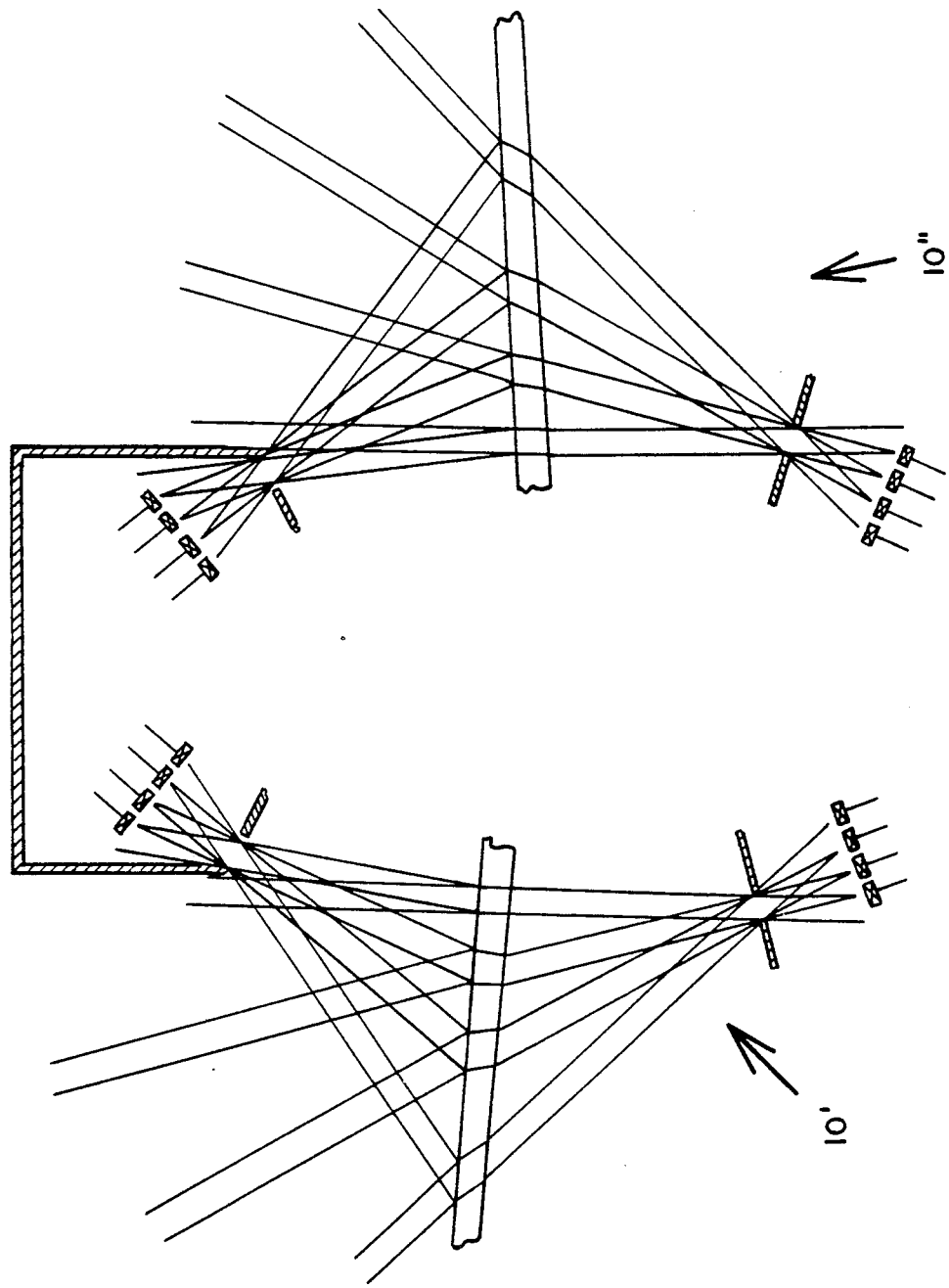
FIG. 3 is a diagram showing a portion of two of the FIG. 2 detection systems to extend the range of valid acceptance angles.

FIG. 2 depicts an arrangement with an acceptable field of regard of 45°. By providing two apparatuses 10' and 10" (the comparator circuits are omitted for sake of clarity of illustration) as shown in FIG. 3, the acceptable field of regard may be extended to 90° with continuous coverage. Further extensions are obtained by using additional apparatus 10.

The angular reception in one plane with the simultaneous identification of angle of arrival, SPOR, and radiation intensity has been described above. Radiation from a source out of the plane containing an orthogonal component in the direction of arrival is also sensed and identified. This is acceptable because the apertures 18 and 26 are extended slits rather than circular apertures. The response to out-of-plane radiation is identical to that of in-plane radiation with the exception that the out-of-plane angle of arrival cannot be determined without ancillary apparatus.

While the invention has been shown and described with reference to its preferred embodiments, it will be understood by those skilled in the art that various changes may be made and equivalents may be substituted for elements thereof without departing from the true spirit and scope of the invention.

What is claimed is:

1. Apparatus for identifying spectrally pure optical radiation (SPOR) in radiation of unknown spectral purity (RUSP)179, comprising:

interferometer means having first and second spaced parallel surfaces traversed by a beam of said RUSP at an acute angle with respect to the normal to said first surface;

said first and second surfaces being partially reflective and partially transmissive relative to said beam;

first and second portions of said beam being respectively transmitted through and reflected from said interferometer means;

first and second optical detectors disposed to receive said first and second beam portions, respectively, and producing respective electrical outputs corresponding to the intensities of said beam portions; and means to compare the magnitudes of said outputs and to provide an indication when said magnitudes are unequal thereby identifying the presence of SPOR.

2. Apparatus according to claim 1 in which said interferometer means is an etalon.

3. Apparatus according to claim 1 in which said last named means comprises a differential amplifier responsive to said outputs, a bridge circuit connected to the output of said amplifier, and means responsive to unbalance of said bridge to indicate such condition.

4. Apparatus according to claim 1 with means for determining the intensity of said outputs and thereby measuring the angle of incidence of said RUSP beam relative to said first surface.

5. Apparatus according to claim 4 in which said last named means comprises a summing amplifier connected to said outputs, and means to measure the amplitude of the output of said amplifier.

6. Apparatus according to claim 1 with said RUSP beam being incident on said first surface of said interferometer means in a plane and at a plurality of different angles, and a plurality of said first detectors and a plurality of said second detectors, said first and second detectors being disposed in said plane to receive said first and second portions, respectively, of said beam at each of said different incident angles, and means for measuring said magnitudes of said outputs of said detectors and thereby identifying the incident angles of said RUSP beam.

7. A method of identifying spectrally pure optical radiation (SPOR) in radiation of unknown spectral purity (RUSP) comprising the steps of:

directing RUSP toward first and second plane laterally spaced parallel partially reflective-partially transmissive surfaces of an interferometer at an angle relative to a normal to said first surface;

reflecting a first portion of said RUSP from said first and second surfaces and transmitting a second portion of said RUSP through said first and second surfaces; and comparing the intensities of said first and second RUSP portions and providing an indication of inequality thereof to thereby identify the presence of SPOR.

8. The method according to claim 7 with the additional step of measuring the intensities of said first and second RUSP portions and thereby providing an indication of the magnitude of the angle of incidence of RUSP on said first surface.

9. A method of identifying spectrally pure optical radiation (SPOR) in radiation of unknown spectral purity (RUSP) in a first plane consisting of the steps of:

directing RUSP toward an interferometer at an angle relative to a normal to said interferometer;

reflecting a first portion of said RUSP from said interferometer and transmitting a second portion of said RUSP through said interferometer;

comparing the intensities of said first and second RUSP portions and providing an indication of inequality thereof to thereby identify the presence of SPOR; and repeating the above steps for other RUSP propagating in said first plane and at an angle to the direction of propagation of said first named RUSP.

* * * * *